(12) United States Patent
Higuchi

(10) Patent No.: US 8,133,990 B2
(45) Date of Patent: Mar. 13, 2012

(54) 6-POSITION HIGHLY ACETYLATED CELLULOSE DIACETATE AND PROCESS FOR PRODUCING THE SAME

(75) Inventor: Akihiro Higuchi, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 419 days.

(21) Appl. No.: 12/343,217

(22) Filed: Dec. 23, 2008

(65) Prior Publication Data

US 2009/0171079 A1 Jul. 2, 2009

(30) Foreign Application Priority Data

Dec. 27, 2007 (JP) ................................ 2007-337746

(51) Int. Cl.
*C08B 3/06* (2006.01)
*C08B 3/24* (2006.01)
(52) U.S. Cl. .......................................... 536/69; 536/76
(58) Field of Classification Search .................... 536/69, 536/76
See application file for complete search history.

(56) References Cited

FOREIGN PATENT DOCUMENTS

| | | | |
|---|---|---|---|
| EP | 1375521 A1 | 1/2004 |
| EP | 1792918 A1 | 6/2007 |
| JP | 2002-62430 A | 2/2002 |
| JP | 2002-212338 A | 7/2002 |
| JP | 2002-265501 A | 9/2002 |
| JP | 2002-322201 A | 11/2002 |
| JP | 2002-338601 A | 11/2002 |
| JP | 2003-55477 A | 2/2003 |
| JP | 2003-201301 A | 7/2003 |
| JP | 2005-068438 A | 3/2005 |
| JP | 2005-097621 A | 4/2005 |
| JP | 2005-104148 A | 4/2005 |
| JP | 2006-117896 A | 5/2006 |
| JP | 2006-328298 A | 12/2006 |
| JP | 2007-063421 A | 3/2007 |
| JP | 2007-199391 A | 8/2007 |
| JP | 2007-199392 A | 8/2007 |
| JP | 2009-286801 A | 12/2009 |
| JP | 2011-005851 A | 1/2011 |
| WO | WO-2007/086599 A1 | 8/2007 |

OTHER PUBLICATIONS

Office Action issued Nov. 2, 2010, in Japanese Patent Application No. JP2007-337746.

*Primary Examiner* — Shaojia Anna Jiang
*Assistant Examiner* — Jonathan S Lau
(74) *Attorney, Agent, or Firm* — Birch, Stewart, Kolasch & Birch, LLP

(57) ABSTRACT

Disclosed is a cellulose diacetate comprising a 6-position highly acetylated cellulose diacetate having a 6-percent viscosity of 40 to 600 mPa·s, and having a total degree of acetyl substitution of DSt and a degree of acetyl substitution at the 6-position of DS6, wherein DSt and DS6 satisfy following Conditions (1) and (2):

$2.0 \leq DSt < 2.6$ (1)

$0.400 \geq (DS6/DSt) \geq 0.531 - 0.088 \times DSt$ (2)

The cellulose diacetate is usable typically as a starting material for cellulose acylates of different acyl groups, which have a high total degree of acyl substitution, have superior optical properties, and usable typically as photographic materials and optical materials.

9 Claims, 1 Drawing Sheet

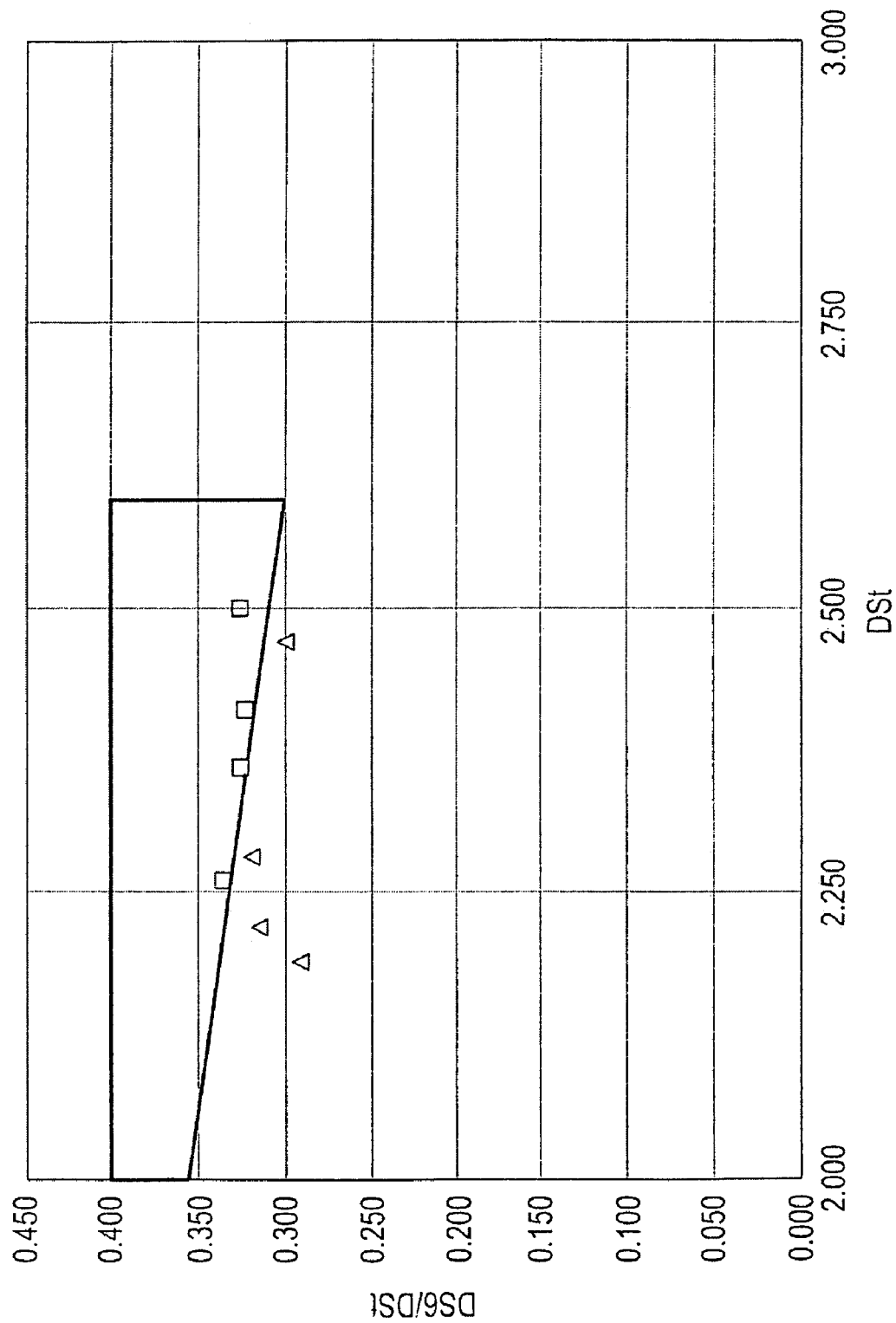

6-POSITION HIGHLY ACETYLATED CELLULOSE DIACETATE AND PROCESS FOR PRODUCING THE SAME

BACKGROUND OF THE INVENTION

1. Field of The Invention

The present invention relates to novel 6-position highly acetylated cellulose diacetates, and processes for the production of the 6-position highly acetylated cellulose diacetates. The novel 6-position highly acetylated cellulose diacetates are useful typically as materials for cellulose acylates of different acyl groups, which cellulose acylates have a high total degree of substitution, and are usable typically as materials for agents for separating optical isomers, materials for films typified by photographic materials and optical materials.

2. Description of The Related Art

Cellulose esters have superior optical properties and are thereby used typically as a variety of optical films. Polarizing plates, for example, are used in liquid crystal displays for use in flat-panel displays typified by liquid crystal display televisions. The polarizing plates are each generally composed of a laminate of a polarizing film with a polarizing plate-protecting film (polarizing film-protecting film) made of a cellulose ester film. Such optical films should have various optical properties, such as optical transparency and refractive index, according to the driving system of the liquid crystal devices. By way of example, refractive indices in in-plane thickness directions, respectively, should be controlled, and a birefringence in the in-plane direction should be increased in vertical alignment (VA) liquid crystal devices. An exemplary procedure for controlling these parameters is film drawing. However, among cellulose esters, a cellulose acetate has low drawability in itself, and control of refractive indices in the in-plane and thickness directions of the resulting cellulose acetate film is limited. In contrast, when a substituent having carbon atoms larger than that of acetyl group is introduced into an original cellulose acetate, the resulting cellulose acetate can have higher drawability. For example, film drawing at a high draw ratio is possible in cellulose esters of different fatty acids, such as a cellulose acetate propionate into which propionyl group having carbon atoms larger than that of acetyl group is introduced. Among such cellulose esters of different fatty acids, acetyl-containing cellulose esters of different fatty acids are more desirable. The possibility of film drawing at a high draw ratio enlarges the controllable area of refractive index, and this in turn enlarges the applicability of the resulting film as an optical film. Specifically, cellulose esters of different fatty acids are more advantageously used than cellulose acetates in uses where drawing is conducted.

There have been known cellulose acylates of different acyl groups, in which hydroxyl groups of a cellulose are substituted by two or more different acyl groups (e.g., acetyl group and another acyl group than acetyl group). Typically, Japanese Patent Publication (JP-A) No. 2002-322201 discloses a cellulose ester of different acids in which hydrogen atoms of hydroxyl groups of a cellulose are substituted by both a substituted or unsubstituted aromatic acyl group and a substituted or unsubstituted aliphatic acyl group. The document mentions that this cellulose ester of different acids can give a film superior in optical isotropy, optical transparency, water resistance, and dimensional stability. In the examples of this document, cellulose benzoate trifluoroacetate, for example, is synthetically prepared.

JP-A No. 2006-328298 discloses an optical film which is formed by melting a composition mainly containing a cellulose ester, in which the cellulose ester satisfies following Conditions (1) and (2):

$$2.4 \leq X+Y \leq 2.9 \quad (1)$$

$$0.3 \leq Y \leq 1.5 \quad (2)$$

wherein X represents the degree of substitution by acetic acid; and Y represents the degree of substitution by an aromatic carboxylic acid.

In the examples of this document, cellulose acylates of different acyl groups, such as cellulose acetate benzoate, are synthetically prepared by reacting a cellulose as a material with two different carboxylic acids. This reaction, however, is a reaction under nonuniform conditions and does not proceed uniformly. It is considered that the reaction of a carboxylic acid having higher reactivity first occurs on the cellulose surface, and thereafter the reaction of another carboxylic acid having lower activity occurs. In addition, the product cellulose ester derivative is a composition of derivative molecules having a large molecule-to-molecule variation and includes, for example, an acetyl-rich derivative and a benzoyl-rich derivative. This composition has disadvantages such that constitutional derivatives have different solubilities in a solvent and thereby cause phase separation; if the composition is formulated into a dope, the dope becomes turbid, is difficult to filtrate or is impossible to filtrate; and the composition shows a large intermolecular distribution of degree of substitution.

JP-A No. 2007-199392 and JP-A No. 2007-199391 disclose cellulose acylate films having specific optical properties. The techniques disclosed in these documents, however, merely give cellulose acetate derivatives having a high degree of substitution by benzoyl group at the 6-position of a glucose backbone, and they fail to provide a cellulose acetate derivative having benzoyl group selectively introduced at the 2- and 3-positions of the glucose backbone.

As has been described above, there have been known cellulose acylates of different acyl groups in which hydroxyl groups of cellulose are substituted by acetyl group and other acyl groups than acetyl group; however, there is known no cellulose acylate of different acyl groups which has a very high degree of acetyl substitution at the 6-position of glucose backbone, a high degree of substitution with other acyl groups than acetyl group at the 2- and 3-positions of glucose backbone, and a high total degree of acyl substitution. The cellulose acylate of different acyl groups having such a distribution of substituents is expected to exhibit unprecedented specific optical properties.

Possible processes for the production of such a cellulose acylate of different acyl groups having the above-mentioned distribution of substituents include a process of introducing other acyl groups than acetyl group into free hydroxyl groups of a material cellulose acetate; a process of introducing acetyl group preferentially into hydroxyl group at the 6-position of a material cellulose acetate and subsequently introducing other acyl groups than acetyl group into the 2- and 3-positions of the cellulose acetate. In these processes, however, how acetyl group distributes as a substituent in the glucose ring of the material cellulose acetate is very important. Specifically, when hydroxyl group at a certain position of the glucose backbone has been substituted by acetyl group, it is difficult to introduce another acyl group into this position. Accordingly, when the above processes are employed, the starting material should be a cellulose acetate which has a controlled distribution of acetyl group in the glucose ring. In particular, a cellulose acetate having a high degree of acetyl substitution at the 6-position may be advantageous as the starting material.

Cellulose acetates are classified into cellulose triacetates, cellulose diacetates, and cellulose monoacetates, of which cellulose triacetates and cellulose diacetates are industrially important. In general, a cellulose acetate having a degree of acetyl substitution of 2.6 or more is designated as a "cellulose triacetate", and one having a degree of acetyl substitution of 2 or more and less than 2.6 is designated as a "cellulose diacetate". Cellulose acetates have largely varying properties depending typically on the degree of acetyl substitution and the degree of polymerization, and, by controlling these parameters, they can be used in a variety of applications.

Known cellulose acetates having a high degree of acetyl substitution at the 6-position are those having a high total degree of acetyl substitution, as mentioned below. However, there has been known no cellulose acetate that has a high degree of acetyl substitution at the 6-position, has a not-so-high total degree of acetyl substitution as to give margin of introducing other acyl groups than acetyl group to some extent, and has a relatively high molecular weight.

By way of example, JP-A No. 2005-97621 describes that, when a cellulose acetate is prepared according to a common procedure, the degree of acetyl substitution at the 2-position or 3-position is higher than the degree of acetyl substitution at the 6-position. This document discloses a technique of improving a cellulose acylate so as to have a low retardation value of the product film; and discloses a cellulose acetate that has a total degree of acetyl substitution at the 2-, 3-, and 6-positions of 2.67 or more, a total degree of acetyl substitution at the 2- and 3-positions of 1.97 or less, and a degree of acetyl substitution at the 6-position of 0.85 or more and 0.98 or less. JP-A No. 2005-68438 discloses a technique of improving a cellulose acylate so as to prepare a cellulose acylate solution that is superior in long-term stability and shows a low viscosity in practicable concentrations as a dope. There is disclosed a cellulose acylate that is controlled to have a total degree of acyl substitution at the 2- and 3-positions of 1.70 or more and 1.90 or less and a degree of acyl substitution at the 6-position of 0.88 or more. These cellulose acylates, however, each have a high total degree of acyl substitution and thereby have little margin of introducing other acyl groups than acetyl group into the 2- and 3-positions. These cellulose acylates are each prepared under such reaction conditions that the amount of catalytic sulfuric acid is reduced to prolong the acetylation reaction time. However, because of such a small amount of the catalytic sulfuric acid, the product cellulose acylates prepared under these reaction conditions show a large distribution in degree of substitution, include large amounts of insoluble components, and, if formed into an optical film, include large amounts of optical foreign matter. In addition, the product cellulose acylates are liable to have lower molecular weights, because the small amount of the catalytic sulfuric acid causes a lowered hydrolysis rate and thereby a prolonged hydrolysis process time in acylation and hydrolysis steps of the cellulose acylates.

JP-A No. 2002-338601 and JP-A No. 2003-201301 disclose techniques of preparing cellulose acetates by reacting a cellulose with acetic acid or acetic anhydride in a solvent in the presence of a catalyst to give a cellulose acetate, and subjecting the cellulose acetate to ripening or aging (hydrolysis) in the presence of water in an amount of 10 percent by mole or less. These documents describe that the intermolecular or intramolecular distribution of degree of acetyl substitution can be controlled by the above procedures even if a large amount of catalytic sulfuric acid is used, and that the resulting cellulose acetates have a degree of acetyl substitution at the 2-position of 2DS, a degree of acetyl substitution at the 3-position of 3DS, and a degree of acetyl substitution at the 6-position of 6DS, in which 2DS, 3DS, and 6DS satisfy the following conditions:

$$2DS+3DS>1.80,$$

$$3DS<2DS, \text{ and}$$

$$6DS>0.80$$

These cellulose acetates each have a uniform distribution of the degree of acetyl substitution, where acetyl groups are uniformly distributed, and have high solubility in a solvent even when they are cellulose triacetates having a high degree of substitution of, for example, from 2.636 to 2.958. These cellulose acetates, however, have little margin of introducing other acyl groups than acetyl group into the 2- and 3-positions, because they have a high degree of acetyl substitution at the 2- and 3-positions.

SUMMARY OF THE INVENTION

Accordingly, an object of the present invention is to provide a novel 6-position highly acetylated cellulose diacetate that has a high degree of acetyl substitution at the 6-position, has a not-so-high total degree of acetyl substitution so as to have a certain margin of introducing other acyl groups than acetyl group into the 2- and 3-positions, and has a relatively high molecular weight. Specifically, the 6-position highly acetylated cellulose diacetate is a cellulose diacetate that is useful typically as a starting material to give a cellulose acylate of different acyl groups. The cellulose acylate of different acyl groups has a high total degree of acyl substitution and shows such superior optical properties as to be usable typically as photographic materials and optical materials. More preferably, the cellulose acylate of different acyl groups has a very high degree of acetyl substitution at the 6-position, a high degree of substitution with other acyl groups than acetyl group at the 2- and 3-positions, and a high total degree of acyl substitution.

Another object of the present invention is to provide a process for industrially efficiently producing a 6-position highly acetylated cellulose diacetate that is useful typically as a starting material to give a cellulose acylate of different acyl groups. The cellulose acylate of different acyl groups has a high total degree of acyl substitution and shows such superior optical properties as to be usable typically as photographic materials and optical materials. More preferably, the cellulose acylate of different acyl groups has a very high degree of acetyl substitution at the 6-position, a high degree of substitution with other acyl groups than acetyl group at the 2- and 3-positions, and a high total degree of acyl substitution.

After intensive investigations to achieve the objects, the present inventors had the following findings. Fundamental principles of processes for synthesizing cellulose acetates are described by Uda et al. in "Wood Chemistry", pages 180-190 (Kyoritsu Shuppan Co., Ltd. (1968)). A representative synthetic process is a liquid phase acetylation using acetic anhydride (as an acetyl group donor), acetic acid (as a solvent), and sulfuric acid (as a catalyst). Specifically, a material cellulose such as wood pulp is pretreated with an adequate amount of acetic acid, and the pretreated material is added into a cooled acetylation mixture to convert into an acetic acid ester to thereby give a cellulose acetate. The acetylation mixture generally contains acetic acid as a solvent, acetic anhydride as an acetyl group donor (esterifying agent), and sulfuric acid as a catalyst. The acetic anhydride is generally used in a stoichiometrically excess amount to the total amount of the cellulose as a reactant and water in the system. After the completion of acetylation reaction, an aqueous solution of a neutralizing agent is added for the hydrolysis of excess acetic anhydride remained in the system and for the neutralization of part of the esterification catalyst. Exemplary neutralizing agents herein include carbonates, acetates, and oxides of sodium, potassium, calcium, magnesium, iron, aluminum, zinc, and ammonium. According to known processes, the prepared cellulose acetate is ripened or aged by maintaining at 50° C. to 90° C. in the presence of a small amount of an acetylation catalyst (generally, the residual sulfuric acid) to convert into a cellulose acetate having a desired degree of acetyl substitution and a desired degree of polymerization. At the time when such a desired cellulose acetate is obtained, the residual catalyst in the system is fully neutralized with a neutralizing agent as mentioned above, or, without neutralizing the residual catalyst, the cellulose acetate solution is poured into water or diluted acetic acid, or water or diluted acetic acid is poured into the cellulose acetate solution to separate the cellulose acetate, and the separated cellulose acetate is washed and stabilized to thereby give a product cellulose acetate. JP-A No. Hei 11-5851 discloses that use of a small amount of sulfuric acid in an acetylation reaction gives a cellulose acetate having a relatively high degree of substitution at the 6-position. However, the cellulose acetate produced under such low sulfuric acid conditions may suffer from cloudiness in a solution or may have insufficient solubility. This is probably because the product cellulose acetate is heterogenous, since an acetylation reaction proceeds while the cellulose starting material as a solid phase is gradually dissolved as a result of acetylation; and there occurs a difference in quality between a portion which is dissolved precedently and another portion which is dissolved subsequently.

In general, esterification (acetylation) and hydrolysis reactions proceed simultaneously with a decomposition reaction of β-glucosidic linkages (depolymerization reaction) as reactions of cellulose acetates, both in an acetylation step and in a hydrolysis step (ripening step). The decomposition reaction of β-glucosidic linkages cleaves and thereby shortens the polymer chain of cellulose ester, and the resulting cellulose ester has a decreasing molecular weight. The descriptions disclosed in above-mentioned JP-A No. 2002-338601 and JP-A No. 2003-201301 are interesting. According to the descriptions disclosed in these documents, a cellulose acetate having a high degree of substitution at the 6-position can be obtained by reducing the amount of water in hydrolysis. Specifically, acetyl group bonded to the cellulose is decomposed, by the action of water, into free acetic acid and into a hydroxyl group bonded to the cellulose in the ripening reaction (hydrolysis reaction). This reaction requires water and thereby proceeds at a significantly low rate in the presence of an insufficient amount of water, to show an insufficient production efficiency. Therefore, the reaction is generally conducted in the presence of water in an amount of 50 percent by mole or more. This had been a technological common knowledge before the techniques in JP-A No. 2002-338601 and JP-A No. 2003-201301 were disclosed. JP-A No. 2002-338601 and JP-A No. 2003-201301 disclose that, in the case of a cellulose acetate, a cellulose triacetate having high degree of substitution at the 6-position can be obtained by carrying out a ripening (hydrolysis) reaction in the presence of water in an amount of less than 10 percent by mole with respect to the acetyl donor. In other known techniques, control of the total degree of substitution by allowing hydrolysis to proceed has been conducted to reduce the total degree of substitution of a cellulose acetate to thereby give a desired cellulose diacetate.

Accordingly, in consideration of the techniques disclosed in JP-A No. 2002-338601 and JP-A No. 2003-201301, it is expected that a cellulose diacetate having a high degree of substitution at the 6-position can be obtained by carrying out hydrolysis in the presence of water in a reduced amount for a prolonged duration in the ripening step (hydrolysis reaction).

It was found, however, that this technique invites an unexpectedly low molecular weight and thereby fails to provide a cellulose diacetate that has both a high molecular weight and a high degree of acetyl substitution at the 6-position. Specifically, it was found that the products have reduced molecular weights according to the techniques disclosed in these documents, even though the amount of catalytic sulfuric acid is a substantially common amount as catalytic sulfuric acid, and the hydrolysis reaction time is not so long. After investigations to determine why this occurs, the present inventors have found that if a ripening reaction is conducted in the presence of a smaller amount of water, the depolymerization (decomposition reaction of β-glucosidic linkages) in the ripening step proceeds at a higher reaction rate. Accordingly, if a hydrolysis reaction is conducted in the presence of a smaller amount of water in order to increase the degree of substitution at the 6-position relatively in distribution of degree of substitution in the glucose ring, and if the hydrolysis reaction of this type is conducted for a long time so as to give a cellulose diacetate having a relatively low total degree of substitution, the depolymerization increasingly occurs to cleave the polymer chain of the cellulose acetate. This impedes the production of a cellulose diacetate that has both a high molecular weight and a high degree of acetyl substitution at the 6-position.

After further investigations, the present inventors have found that the molecular weight of the product cellulose diacetate is also significantly affected by the reaction temperature (ripening temperature) in the hydrolysis reaction and the amount of an acetylation catalyst. Specifically, they have found that the depolymerization rate may increase with an elevating ripening temperature, whereby the product cellulose diacetate may often have a lower molecular weight; that an acetylation catalyst, if used in an excessively small amount, may cause a longer hydrolysis time and may thereby cause a lower molecular weight of the cellulose diacetate; and that an acetylation catalyst, if used in an excessively large amount, acts to increase the variation (dispersion) of depolymerization rate depending on the ripening temperature and to increase the depolymerization rate, whereby the product has a lower molecular weight. The present invention has been made based on these findings and further investigations.

Specifically, according to an embodiment of the present invention, there is provided a 6-position highly acetylated cellulose diacetate having a total degree of acetyl substitution of 2.0 or more and less than 2.6, which has a 6-percent viscosity of 40 to 600 mPa·s and has a total degree of acetyl substitution of DSt and a degree of acetyl substitution at the 6-position of DS6, wherein DSt and DS6 satisfy following Conditions (1) and (2):

$$2.0 \leq DSt < 2.6 \tag{1}$$

$$0.400 \geq (DS6/DSt) \geq 0.531 - 0.088 \times DSt \tag{2}$$

According to another embodiment of the present invention, there is provided a process for the production of a 6-position highly acetylated cellulose diacetate. This process includes the step of hydrolyzing a cellulose triacetate having a total degree of acetyl substitution of 2.6 or more in acetic acid, in the presence of an acetylation catalyst in an amount of 0.56 to 8.44 parts by weight to 100 parts by weight of the cellulose triacetate and in the presence of water in an amount of 22 percent by mole or more and less than 50 percent by mole relative to the amount of the acetic acid, at a temperature of from 40° C. to 90° C., to give a cellulose diacetate having a high degree of acetyl substitution at the 6-position.

This process may include the steps of reacting a cellulose with an acetylating agent in a solvent in the presence of a catalyst to give a cellulose triacetate having a total degree of acetyl substitution of 2.6 or more; and hydrolyzing the above-prepared cellulose triacetate in acetic acid in the presence of an acetylation catalyst in an amount of 0.56 to 8.44 parts by weight to 100 parts by weight of the cellulose triacetate and in the presence of water in an amount of 22 percent by mole or more and less than 50 percent by mole relative to the amount of the acetic acid at a temperature of from 40° C. to 90° C., to give a cellulose diacetate having a high degree of acetyl substitution at the 6-position.

According to another yet embodiment of the present invention, there is provided a 6-position highly acetylated cellulose diacetate obtainable by said process.

Such 6-position highly acetylated cellulose diacetates according to embodiments of the present invention each have a not-so-high total degree of acetyl substitution, and a relatively high degree of acetyl substitution at the 6-position with respect to the total degree of acetyl substitution. Accordingly, these cellulose diacetates give, through further acylation, cellulose acylates of different acyl groups having a high total degree of acyl substitution. In particular, they can give, through further acylation, cellulose acylates of different acyl groups, which have a very high degree of acetyl substitution at the 6-position, a high degree of substitution with other acyl groups than acetyl group at the 2- and 3-positions, and a high total degree of acyl substitution. These cellulose acylates of different acyl groups having a high total degree of acyl substitution can be used typically as photographic materials and optical materials, because they show specific substituent distributions and thereby exhibit superior optical properties, such as properties relating to orientation birefringence and photoelastic coefficient of oriented films made from the cellulose acylates.

Processes for the production of 6-position highly acetylated cellulose diacetates according to embodiments of the present invention can industrially efficiently produce the 6-position highly acetylated cellulose diacetates that are useful typically as starting materials for photographic materials and optical materials.

These and other objects, features, and advantages of the present invention will be more fully understood from the following description of preferred embodiments with reference to the attached drawing. All numbers are herein assumed to be modified by the term "about."

BRIEF DESCRIPTION OF THE DRAWINGS

FIG. 1 is a graph in which DSt is plotted against DSt/DS6 of cellulose diacetates prepared according to Examples 1 to 4 and Comparative Examples 1 to 4.

DESCRIPTION OF THE PREFERRED EMBODIMENTS

[6-Position Highly Acetylated Cellulose Diacetate]

6-Position highly acetylated cellulose diacetates having a total degree of acetyl substitution of 2.0 or more and less than 2.6 according to embodiments of the present invention, each has a 6-percent viscosity of 40 to 600 mPa·s and has a total degree of acetyl substitution of DSt and a degree of acetyl substitution at the 6-position of DS6, wherein DSt and DS6 satisfy following Conditions (1) and (2):

$$2.0 \leq DSt < 2.6 \quad (1)$$

$$0.400 \geq (DS6/DSt) \geq 0.531 - 0.088 \times DSt \quad (2)$$

The total degree of acetyl substitution DSt is 2.0 or more and less than 2.6, and is preferably 2.10 or more and 2.51 or less, and more preferably 2.20 or more and 2.50 or less. A cellulose diacetate, if having an excessively low total degree of acetyl substitution (DSt), may show insufficient solubility in an organic solvent and may be not easily handled upon acylation of the cellulose diacetate as a starting material, and, additionally, the designing of the subsequent acylation reaction may be liable to be complicated. A cellulose diacetate, if having an excessively high total degree of acetyl substitution, may be difficult to give a cellulose acylate of different acyl groups which is excellent in optical properties, because only a smaller amount of other acyl groups than acetyl group can be introduced into the cellulose diacetate.

An upper limit of the ratio (DS6/DSt) of the degree of acetyl substitution at the 6-position to the total degree of acetyl substitution is 0.400, but is preferably 0.370, and more preferably 0.360, from the viewpoint of easy production. If the ratio (DS6/DSt) of the degree of acetyl substitution at the 6-position to the total degree of acetyl substitution is less than "0.531−0.088×DSt", a relatively small amount of acetyl group is present at the 6-position, and this may impede the production through acetylation of a cellulose acylate of different acyl groups which has a very high degree of acetyl substitution at the 6-position and a high degree of substitution with other acyl groups than acetyl group at the 2- and 3-positions.

The 6-position highly acetylated cellulose diacetates herein have a degree of acetyl substitution at the 6-position DS6 of preferably 0.745 or more (e.g., 0.745 to 0.900), and more preferably 0.750 or more (e.g., 0.750 to 0.850).

The total degree of acetyl substitution DSt and the degree of acetyl substitution at the 6-position DS6 can be set suitably according typically to properties, such as retardation, required for films formed from cellulose acylates of different acyl groups which are in turn formed from the 6-position highly acetylated cellulose diacetates.

The respective degrees of acetyl substitution at the 2-, 3-, and 6-positions in the glucose ring of these 6-position highly acetylated cellulose diacetates can be measured by NMR according to the method described by Tezuka (Tezuka, Carbohydr. Res. 273, 83(1995)). Specifically, free hydroxyl groups of a cellulose diacetate sample are propionylated with propionic anhydride in pyridine, the resulting sample is dissolved in deuterated chloroform and subjected to $^{13}$C-NMR spectral measurement. Carbon signals of acetyl group appear in the order of the 2-position, 3-position, and 6-position from a higher magnetic field in a region of from 169 ppm to 171 ppm, and carbonyl carbon signals of propionyl group appear in the same order in a region of from 172 ppm to 174 ppm. The respective degrees of acetyl substitution at the 2-, 3-, and 6-positions in the glucose ring of the original cellulose diacetate can be determined based on abundance ratios between acetyl group and propionyl group at the corresponding positions, respectively. The degrees of acetyl substitution can also be determined by $^1$H-NMR, other than $^{13}$C-NMR.

A most general method for determining the average degree of substitution of a cellulose acetate is the method for measuring an acetylation degree as specified in ASTM-D-817-91 (the test method typically for cellulose acetate). According to the method specified in ASTM, the acetylation degree is determined in terms of the amount of binding acetic acid. This value may be converted into a degree of substitution according to the following equation:

$$DS = 162 \times AV \times 0.01/(60-42 \times AV \times 0.01)$$

In the equation, DS represents the total degree of acetyl substitution; and AV represents the acetylation degree (%). The converted degree of substitution may generally have a some error with respect to the value measured by NMR. When the converted value differs from the NMR measured value, the NMR measured value is employed. If different values are obtained depending on specific procedures of NMR measurement, the NMR measured value according to the Tezuka's method is employed.

The 6-percent viscosity of 6-position highly acetylated cellulose diacetates is 40 to 600 mPa·s, and is preferably about 40 to 400 mPa·s, more preferably about 40 to 280 mPa·s, and particularly preferably about 45 to 200 mPa·s. If a cellulose diacetate having a 6-percent viscosity of less than 40 mPa·s is acylated to give a cellulose acylate of different acyl groups, the cellulose acylate of different acyl groups may be difficult to be formed into a film. In contrast, a cellulose diacetate having a 6-percent viscosity of more than 600 mPa·s may give a dope having an excessively high viscosity, and this may impede film formation by melting-casting. In the case of a cellulose diacetate having a total degree of acetyl substitution DSt of 2.0, a 6-percent viscosity of 40 mPa·s corresponds to a viscosity-average molecular weight of 33730; and a 6-percent viscosity of 600 mPa·s corresponds to a viscosity-average molecular weight of 62268. In the case of a cellulose diacetate having a total degree of acetyl substitution DSt of 2.6, a 6-percent viscosity of 40 mPa·s corresponds to a viscosity-average molecular weight of 37180, and a 6-percent viscosity of 600 mPa·s corresponds to a viscosity-average molecular weight of 68640.

The 6-percent viscosity of a 6-position highly acetylated cellulose diacetate can be measured in the following manner.

In an Erlenmeyer flask are placed 3.00 g of a dried sample and 39.90 g of a 95% aqueous acetone solution, and the flask is tightly stopped, followed by stirring for about one and a half hours. Then the sample is completely dissolved by shaking for one hour in a rotary shaker, to give a 6 weight/volume percent solution. The solution is transferred into a predetermined Ostwald viscometer up to the marker line, and the temperature of the solution is regulated at 25±1° C. for about 15 minutes. The flow time required to pass through time marker lines is measured, and the 6-percent viscosity is calculated according to the following equation:

6-Percent viscosity (mPa·s)=(Flow time (s))×(Viscometer coefficient)

The viscometer coefficient is determined by measuring the flow time of a standard solution for viscometer calibration [supplied by SHOWA SHELL SEKIYU K. K. under the trade name of "JS-200" (in accordance with Japanese Industrial Standards (JIS) Z 8809)] by the above procedure, and calculating the viscometer coefficient according to the following equation:

Viscometer coefficient={(Absolute viscosity of standard solution (mPa·s))×(Density of solution (0.827 g/cm³))}/{(Density of standard solution (g/cm³))×(Flow time of standard solution (second))}

The viscosity-average degree of polymerization of the 6-position highly acetylated cellulose diacetates is, for example, from 137 to 253, preferably from 137 to 236, more preferably from 137 to 220, and particularly preferably from 142 to 206.

The viscosity-average degree of polymerization can be determined by the intrinsic viscosity method of Uda et al. (Kazuo Uda & Hideo Saito: Journal of the Society of Fiber Science and Technology, Japan, Vol. 18, No. 1, 105-120, 1962). In the method, a solvent may be selected according typically to the degree of substitution of a cellulose diacetate. For example, a sample cellulose diacetate is dissolved in a 9:1 (by weight) mixture of methylene chloride and methanol to give a solution of a predetermined concentration "c" (2.00 g/L); the solution is injected into an Ostwald viscometer; and the flow time "t" in seconds of the solution required to pass through between the viscometer graduations at 25° C. is measured. Separately, the flow time "$t_0$" in seconds of the solvent mixture alone is measured by the above procedure; and the viscosity-average degree of polymerization is calculated according to the following equation:

$$\eta_{rel} = t/t_0$$

$$[\eta] = (\ln \eta_{rel})/c$$

$$DP = [\eta]/(6 \times 10^{-4})$$

wherein "t" represents the flow time in seconds of the solution; "$t_0$" represents the flow time in seconds of the solvent; "c" represents the cellulose diacetate concentration (g/L) of the solution; $\eta_{rel}$ represents the relative viscosity; [η] represents the intrinsic viscosity; and DP represents the average degree of polymerization.

In a preferred embodiment, a 6-position highly acetylated cellulose diacetate is a cellulose diacetate having a uniformly distributed total degree of acetyl substitution. The uniformity of the total degree of acetyl substitution may be determined based on, as an index, the magnification of half height width of a maximum peak in an intermolecular distribution curve of degree of substitution or in an intermolecular distribution curve of acetylation degree of a cellulose diacetate. The half height width of a maximum peak in an intermolecular distribution curve of degree of substitution of a cellulose diacetate is preferably 0.150 or less, more preferably 0.140 or less, and particularly preferably 0.130 or less.

As used herein a "half height width" refers to a width of a chart at a height half the peak height in the chart, in which the chart is plotted with the abscissa (X-axis) indicating a degree of substitution and the ordinate (Y-axis) indicating an abundance at the degree of substitution. The half height width is an index indicating how the distribution disperses. Specifically, the term "substitution degree unit" means that the degree of substitution is employed as the unit of the X-axis. Typically, when the X-axis is indicated in substitution degree (total substitution degree) units, and degrees of substitution corresponding to the half the peak height are 2.6 and 2.8, respectively, the half height width expressed in degree of substitution is: 2.8−2.6=0.2.

The half height width of chemical composition (compositional distribution) may be determined through high-performance liquid chromatography (HPLC). Specifically, the half height width of chemical composition of a cellulose diacetate according to an embodiment of the present invention can be determined in the following manner. Two or more cellulose acetates (hereinafter also referred to as "cellulose esters") having different degrees of substitution as standard referential materials are subjected to high-performance liquid chromatography (HPLC) using a predetermined measuring instrument under predetermined measuring conditions; and a calibration curve is plotted based on the resulting data of the standard referential materials. The calibration curve is a curve indicating how the abundance of a cellulose ester varies depending on the degree of substitution, and is generally a quadric curve, and is preferably a parabola. Based on the plotted calibration curve, the half height width of chemical composition of the target cellulose diacetate is determined.

More specifically, the half height width of chemical composition can be determined by plotting an elusion curve of the sample cellulose ester (cellulose diacetate) measured under predetermined process conditions through HPLC (reverse-phase HPLC), and converting the abscissa (retention time) in the elusion curve into a degree of substitution (0 to 3).

The way to convert the retention time into a degree of substitution can be, for example, a method described in JP-A No. 2003-201301 (Paragraphs [0037] to [0040]). By way of example, when an elusion curve is converted into a distribution curve of degree of substitution (intermolecular distribution of degree of substitution), it is accepted that retention times of two or more (e.g., four or more) samples having different degrees of substitution are measured under the same measuring conditions, and a conversion formula (transformation) is plotted, according to which a degree of substitution (DS) is determined from an retention time (T). Specifically, the function of calibration curve is determined through the least squares method based on the relationship between the retention time (T) and the degree of substitution (DS). The function is generally given in a quadratic shown below:

$$DS = aT^2 + bT + c$$

wherein DS represents the degree of substitution of ester (degree of acetyl substitution); T represents the retention time; and "a", "b", and "c" are coefficients of the conversion formula.

The resulting distribution curve of degree of substitution determined according to the conversion formula is a distribution curve of the degree of substitution of the cellulose ester, with the ordinate indicating an abundance of the cellulose ester and the abscissa indicating a degree of substitution of the cellulose ester. Based on the distribution curve of degree of substitution, the half height width of chemical composition with respect to an observed maximum peak (E) corresponding to an average degree of substitution is determined in the following manner. Specifically, a base line (A-B) tangent is drawn from the base point (A) at the lower degree of substitution to the base point (B) at the higher degree of substitution of the maximum peak (E). Independently, a line perpendicular to the abscissa is drawn from the maximum peak (E) of the curve to determine the intersection (C) between the perpendicular line and the base line (A-B). The midpoint (D) between the peak (E) and the intersection (C) is then determined. A line including the midpoint (D) is drawn parallel to the base line (A-B) to determine two intersections (A', B') of the line and the distribution curve of the degree of intermolecular substitution. From each of the intersections (A', B'), a line perpendicular to the abscissa is drawn. The interval between the feet of the thus-drawn perpendiculars is defined as the half height width of the maximum peak.

The half height width of chemical composition reflects that respective cellulose ester molecules contained in a sample show different retention times depending on how hydroxyl groups of respective glucose rings are esterified in respective high-polymer chains constituting the cellulose ester molecules. Therefore, the width of the retention time ideally indicates the width of chemical composition in the substitution degree unit. However, a high-performance liquid chromatograph has a duct, such as a guide column for protecting the measuring column, that does not contribute to the partition (distribution). The width of retention time often includes an error that is caused not by the width of chemical composition but by the configuration of the measuring instrument. The error is affected typically by the length and inner diameter of the column, and the length and routing from the column to a detector, and varies depending on the configuration of the measuring instrument, as mentioned above. Thus, the half height width of chemical composition of the cellulose ester may be determined as a corrected value Z according to a compensation formula. The compensation formula can give a more accurate half height width of chemical composition as a constant or substantially constant value not depending on the type of a measuring instrument and the measuring conditions. The compensation formula is generally represented by the following formula:

$$Z = (X^2 - Y^2)^{1/2}$$

wherein X represents the half height width of chemical composition (uncorrected value) determined with a predetermined measuring instrument under predetermined measuring conditions; and Y represents the half height width of chemical composition of a cellulose ester having a total degree of substitution of 3, determined with the same measuring instrument under the same measuring conditions as in X.

A "cellulose ester having a total degree of substitution of 3" as used in the above formula refers to a cellulose ester in which all hydroxyl groups of a material cellulose are esterified (e.g., in the case of cellulose acetates, the term refers to a cellulose triacetate having a acetylation degree of 62.5%), corresponds to a fully substituted cellulose ester obtained before ripening (and deacylation). It is in fact, or ideally, a cellulose ester having no half height width of chemical composition, i.e., a cellulose ester having a half height width of chemical composition of 0.

As has been described above, the intermolecular distribution curve of degree of substitution of a cellulose diacetate can be determined by plotting an elusion curve of the cellulose diacetate in reverse-phase HPLC, and converting the abscissa (retention time) of the elusion curve into a total degree of acetyl substitution (0 to 3). The reverse-phase HPLC may be conducted under the following conditions:

Eluent composition: Linear gradient by 28 minutes from chloroform/methanol (9/1, v/v)):methanol/water (8/1, v/v)=20:80 to chloroform/methanol (9/1, v/v)=100

Column: NovaPack Phenyl, 3.9×150 mm (Waters, Milford, Mass.))

Column temperature: 30° C.

Flow rate: 0.7 ml/min.

Sample concentration: 2 mg/ml

Injection: 20 µl

Detector: Evaporative light scattering detector (ELSD-MK-III; Varex)

Drift tube temperature: 80° C.

Gas flow rate: 2.1 SLPM (standard liter per minute)

The sulfate content of a 6-position highly acetylated cellulose diacetate according to an embodiment of the present invention is, for example, 100 ppm by weight or less (e.g., 1 to 100 ppm by weight), preferably 70 ppm by weight or less (e.g., 1 to 70 ppm by weight), and more preferably 50 ppm by weight or less (e.g., 1 to 50 ppm by weight) based on the total weight of the 6-position highly acetylated cellulose diacetate. A cellulose diacetate, if having a large sulfate content, may cause problems such as yellowing of a product upon drying or with aged deterioration and may cause deterioration in functions of the product.

As used herein a "sulfate content" refers to the total amount of sulfates (sulfate radicals) in the cellulose diacetate (6-position highly acetylated cellulose diacetate) typically in the forms of bonded sulfuric acid, free sulfuric acid, sulfuric acid salts, sulfuric acid esters, and sulfuric acid complexes. The sulfate content of a cellulose diacetate can be measured by firing a bone-dry sample (cellulose diacetate) in an electric furnace at 1300° C., trapping sublimated sulfurous acid gas into a 10 percent by weight aqueous hydrogen peroxide solution, and quantitatively determining the amount (in terms of $SO_4^{2-}$) according to coulometry. The sulfate content is indicated in units of ppm by weight (pars per million by weight) based on the total weight of the cellulose diacetate. The coulometry is conducted under conditions below. Exemplary devices for use in coulometry include the "TOX-10Σ" analyzer (Mitsubishi Chemical Corporation, Tokyo Japan).

Temperature: 1100° C.
Sample amount: 20±2 mg
Combustion gas: Oxygen gas (99.7% or more)
Gas flow rate: Argon 200 ml/min, oxygen 150 ml/min
Combustion tube: Quartz glass tube (inner diameter of inner tube of 13 mm, inner diameter of outer tube of 22 mm)

A 6-position highly acetylated cellulose diacetate having a low sulfate content may be prepared, for example, by using another acetylation catalyst than sulfuric acid and/or by adjusting the amounts of acetic acid and water to be fed to the reaction system in production process of the 6-position highly acetylated cellulose diacetate.

[Production of 6-Position Highly Acetylated Cellulose Diacetate]

A process for the production of a 6-position highly acetylated cellulose diacetate, according to an embodiment of the present invention, includes the step (hydrolysis step) of hydrolyzing a cellulose triacetate having a total degree of acetyl substitution of 2.6 or more in acetic acid, in the presence of an acetylation catalyst in an amount of 0.56 to 8.44 parts by weight to 100 parts by weight of the cellulose triacetate and in the presence of water in an amount of 22 percent by mole or more and less than 50 percent by mole relative to the amount of the acetic acid, at a temperature of from 40° C. to 90° C., to give a cellulose diacetate having a high degree of acetyl substitution at the 6-position. The cellulose triacetate having a total degree of acetyl substitution of 2.6 or more may be prepared according to the step (acetylation step) of reacting a cellulose with acetic acid and/or acetic anhydride in a solvent in the presence of a catalyst. The process may further include the step (activation step (pretreatment step)) of activating the cellulose with an acetylation solvent, prior to the acetylation step. The 6-position highly acetylated cellulose diacetates according to embodiments of the present invention can be produced according to this process. The production process will be illustrated in detail below.

[Material Cellulose]

Exemplary material celluloses are a variety of cellulose sources including wood pulps such as hardwood pulps and softwood pulps; and linter pulps such as cotton linter pulps. These pulps generally contain exotic components such as hemicelluloses. Accordingly, the term "cellulose" as used herein also means and includes an exotic component such as a hemicellulose, in addition to a cellulose. The wood pulp for use herein can be at least one selected from softwood pulps and hardwood pulps and can be a combination of a softwood pulp and a hardwood pulp. The combination use of a linter pulp (e.g., a purified cotton linter) and a wood pulp is also possible. Celluloses having a high degree of polymerization, such as linter pulps, are usable in the present invention, of which a cotton linter pulp is preferred. The cellulose for use herein is preferably a cellulose at least partially containing a linter pulp. The cellulose may have an α-cellulose content (on the weight basis) of 98% or more, for example about 98.5% to 100%, preferably about 99% to 100%, and more preferably about 99.5% to 100%, as an index of degree of crystallinity. The cellulose may be one containing a certain quantity of carboxyl group, for example, binding to a cellulose molecule and/or hemicellulose molecule.

[Activation Step]

In the activation step (or pretreatment step), a cellulose is activated by treating with an acetylation solvent (solvent used in the acetylation step). Acetic acid is generally used as the acetylation solvent, but exemplary acetylation solvents herein further include other solvents than acetic acid, such as methylene chloride; and a solvent mixture of acetic acid with another solvent than acetic acid, such as methylene chloride. A material cellulose is generally supplied in the form of a sheet, and the sheet-like material cellulose is broken into pieces in dry manner and then subjected to an activation treatment (or pretreatment). A strong acid such as sulfuric acid may be added to an acetylation solvent for use in the activation step. However, treatment with an acetylation solvent containing a large amount of a strong acid may accelerate the depolymerization of the cellulose and cause a lowered degree of polymerization of the cellulose. Typically, the amount of a strong acid (sulfuric acid) added in the pretreatment step according to a common technique is about 0.1 to 0.5 part by weight to 100 parts by weight of the material cellulose. It has been revealed that the use of a strong acid (sulfuric acid), in the pretreatment step, in an amount of 0.5 part by weight or more to 100 parts by weight of the material cellulose causes a lowered molecular weight of the cellulose ("Acetate Fiber", Hajime WADANO, Maruzen Co., Ltd., Tokyo, Japan).

The amount of acetylation solvents in the activation step is, for example, about 10 to 100 parts by weight and preferably about 15 to 60 parts by weight, to 100 parts by weight of the material cellulose. The activation step may be conducted at a temperature of, for example, from 10° C. to 40° C., and preferably from 15° C. to 35° C., for a duration (treatment time) of, for example, 10 to 180 minutes, and preferably 20 to 120 minutes.

[Acetylation Step]

The activated cellulose obtained via the activation treatment is acetylated with an acetylating agent in an acetylation solvent in the presence of an acetylation catalyst to give a cellulose acetate typified by a cellulose triacetate. Exemplary acetylation catalysts include strong acids, of which sulfuric acid is preferred. The amount of an acetylation catalyst typified by sulfuric acid in the acetylation step may be about 1 to 20 parts by weight to 100 parts by weight of the material cellulose. The amount herein is in terms of the total amount of the acetylation catalyst further including the amount of the acetylation catalyst used in the activation step. When sulfuric acid is used as the acetylation catalyst, the amount may be about 7 to 15 parts by weight, for example, about 7 to 13 parts by weight, preferably about 8 to 13 parts by weight, and more preferably about 9 to 12 parts by weight, to 100 parts by weight of the material cellulose.

The acetylating agent can be an acetyl halide such as acetyl chloride, but it is generally acetic anhydride. The amount of an acetylating agent in the acetylation step is, for example, about 1.1 to 4 equivalents, preferably 1.1 to 2 equivalents, and more preferably 1.3 to 1.8 equivalents, to hydroxyl groups of the cellulose. The amount of the acetylating agent may also be, for example, 200 to 400 parts by weight and preferably 250 to 350 parts by weight, to 100 parts by weight of the material cellulose.

Exemplary acetylation solvents include acetic acid and methylene chloride, as mentioned above. Two or more different solvents may be used in combination. For example, acetic acid and methylene chloride may be used in combination. The amount of acetylation solvents is, for example, about 50 to 700 parts by weight, preferably about 100 to 600 parts by weight, and more preferably about 200 to 500 parts by weight, to 100 parts by weight of the cellulose. Particularly, in the production of a cellulose triacetate, the amount of acetic acid as an acetylation solvent in the acetylation step is about 30 to 500 parts by weight, preferably about 80 to 450 parts by weight, more preferably about 150 to 400 parts by weight, and particularly preferably about 250 to 380 parts by weight, to 100 parts by weight of the cellulose.

An acetylation reaction may be carried out under common conditions, for example, at temperatures of from about 0° C. to 55° C., preferably from about 20° C. to 50° C., and more preferably from about 30° C. to 50° C. An acetylation reaction may be carried out at relatively low temperatures, such as 10° C. or less (e.g., from 0° C. to 10° C.) in early stages. A duration of a reaction at such low temperatures may be, for example, about 30 minutes or more, preferably about 40 minutes to 5 hours, and more preferably about 60 to 300 minutes, from the beginning of the acetylation reaction. An acetylation time (total acetylation time) may be, for example, from 20 minutes to 36 hours, and preferably from 30 minutes to 20 hours, while it may vary depending typically on the reaction temperature. An acetylation reaction is particularly preferably carried out at temperatures of from 30° C. to 50° C. for at least about 30 minutes to 180 minutes, and preferably about 50 minutes to 150 minutes.

The completion of acetylation reaction can be determined as the time when the reaction system becomes a homogeneous dope (solution), because the reaction system becomes homogeneous when a cellulose triacetate (also called "primary cellulose acetate") is formed as a result of the reaction of cellulose with an acetylating agent, and the homogeneous system is maintained thereafter. More strictly, in an acetylation reaction system, an acetylation reaction acting to increase the degree of acetyl substitution of the cellulose competes against a depolymerization reaction acting to cleave the glycosidic linkages; but the acetylation reaction preferentially occurs according to embodiments of the present invention; and therefore the completion of the acetylation reaction can be detected as the time when a homogeneous reaction system is formed. The completion (endpoint) of an acetylation reaction is also the begging (initiation) of a hydrolysis reaction or alcoholysis reaction.

[Termination of Acetylation Reaction]

After the completion of the acetylation reaction, a reaction terminator (inhibitor) is added to the reaction system to inactivate (quench) the residual acetylating agent in the reaction system. This operation quenches at least the acetylating agent typified by acetic anhydride. The reaction terminator has only to be capable of inactivating the acetylating agent and generally frequently contains at least water. Typically, the reaction terminator may contain water in combination with at least one selected from acetylation solvents (e.g., acetic acid), alcohols, and neutralizing agents. More specifically, exemplary reaction terminators include water alone; a mixture of water with acetic acid; a mixture of water with an alcohol; a mixture of water with a neutralizing agent; a mixture of water with acetic acid and a neutralizing agent; and a mixture of water with acetic acid, an alcohol, and a neutralizing agent.

Exemplary neutralizing agents are basic substances including alkali metal compounds and alkaline earth metal compounds. Exemplary alkali metal compounds include alkali metal hydroxides such as sodium hydroxide and potassium hydroxide; alkali metal carbonates such as sodium carbonate and potassium carbonate; alkali metal hydrogen carbonates such as sodium hydrogen carbonate; carboxylic acid salts of alkali metals, such as sodium acetate and potassium acetate; and sodium alkoxides such as sodium methoxide and sodium ethoxide. Exemplary alkaline earth metal compounds include alkaline earth metal hydroxides such as magnesium hydroxide and calcium hydroxide; alkaline earth metal carbonates such as magnesium carbonate and calcium carbonate; carboxylic acid salts of alkaline earth metals, such as magnesium acetate and calcium acetate; and alkaline earth metal alkoxides such as magnesium ethoxide. Of these neutralizing agents, alkaline earth metal compounds are preferred, of which magnesium compounds, such as magnesium acetate, are more preferred. Each of different neutralizing agents may be used alone or in combination. Such neutralizing agents act to neutralize part of the acetylation catalyst typified by sulfuric acid.

[Ripening Step (Hydrolysis Step)]

After terminating the acetylation reaction, the formed cellulose acetate [cellulose triacetate; a cellulose acetate having a total degree of acetyl substitution of 2.6 or more (2.6 to 3.0)] is subjected to ripening [hydrolysis (deacetylation)] in acetic acid, to thereby give a cellulose diacetate (6-position highly acetylated cellulose diacetate) that has a controlled total degree of acetyl substitution and a controlled distribution of substitution degree. In this reaction, the acetylation catalyst, typified by sulfuric acid, used in the acetylation and remained thereafter is partially neutralized, and the survival acetylation catalyst, typified by sulfuric acid, can be used as a ripening catalyst. Alternatively, all the residual acetylation catalyst, typified by sulfuric acid, remained after the acetylation may be used as a ripening catalyst without neutralization. In a preferred embodiment, the cellulose acetate (cellulose triacetate) is subjected to ripening [hydrolytic decomposition (deacetylation)] by the catalysis of a residual acetylation catalyst, typified by sulfuric acid, as a ripening catalyst. In the ripening, other components, such as a solvent, may be added to the system according to necessity. Exemplary solvents herein include acetic acid, methylene chloride, water, and alcohols.

A key of production processes according to embodiments of the present invention is that a cellulose triacetate is hydrolyzed in the ripening step (hydrolysis step) in acetic acid in the presence of an acetylation catalyst in an amount of 0.56 to 8.44 parts by weight to 100 parts by weight of the cellulose triacetate and in the presence of water in an amount of 22 percent by mole or more and less than 50 percent by mole relative to the amount of the acetic acid at a temperature of from 40° C. to 90° C., to thereby give a cellulose diacetate having a high degree of acetyl substitution at the 6-position. Ripening under these conditions gives a cellulose acetate that has a uniform intermolecular distribution of degree of substitution and has a high degree of acetyl substitution at the 6-position of glucose ring. Typically, the resulting cellulose acetate may show an intermolecular distribution curve of degree of substitution in which a maximum peak has a half height width within the above-specified range. The acetylation catalyst is preferably sulfuric acid. The amounts of the acetylation catalyst and water are on the basis of the amounts at the beginning of the ripening reaction in a batch reaction, and are on the basis of the charging amounts in a continuous reaction.

The amount of acetic acid in the ripening step is preferably about 56 to 1125 parts by weight, more preferably about 112 to 844 parts by weight, and further preferably about 169 to 563 parts by weight, to 100 parts by weight of the cellulose triacetate. The amount of acetic acid in the ripening step is preferably about 100 to 2000 parts by weight, more preferably about 200 to 1500 parts by weight, and further preferably about 300 to 1000 parts by weight, to 100 parts by weight of the cellulose used as a starting material in the acetylation reaction.

The amount of acetylation catalysts typified by sulfuric acid is 0.56 to 8.44 parts by weight, and is preferably 0.56 to 5.63 parts by weight, more preferably 0.56 to 2.81 parts by weight, and particularly preferably 1.69 to 2.81 parts by weight, to 100 parts by weight of the cellulose triacetate. On the other hand, to 100 parts by weight of the cellulose used as a starting material in the acetylation reaction, the amount of acetylation catalysts typified by sulfuric acid is preferably 1 to 15 parts by weight, more preferably 1 to 10 parts by weight, further preferably 1 to 5 parts by weight, and particularly preferably 3 to 5 parts by weight. An acetylation catalyst, if used in an excessively small amount, may cause an excessively long hydrolysis duration and thereby cause the resulting cellulose acetate to have an excessively low molecular weight. In contrast, an acetylation catalyst, if used in an excessively large amount, may cause a large variation (dispersion) of the depolymerization rate depending on the ripening temperature and thereby cause a large depolymerization rate even at relatively low ripening temperatures, and this may impede the production of a 6-position highly acetylated cellulose diacetate having a sufficiently high molecular weight.

The amount of water in this process is 22 percent by mole or more and less than 50 percent by mole, and is preferably from 24 percent by mole to 48 percent by mole, and more preferably from 38 percent by mole to 48 percent by mole, to the amount of the acetic acid. Water, if used in an amount of 50 percent by mole or more to the amount of the acetic acid, may cause a lowered ratio (DS6/DSt) and may impede the production of a 6-position highly acetylated cellulose diacetate. In contrast, water, if used in an amount of less than 22 percent by mole to the amount of the acetic acid, may cause an excessively high depolymerization rate and may impede the production of a 6-position highly acetylated cellulose diacetate having a sufficiently high molecular weight; and the resulting cellulose diacetate may have a high (not lowered) total degree of acetyl substitution and thus have little margin of introducing other acyl groups than acetyl group thereinto.

In actual production processes of cellulose diacetates, it is often conducted that the reaction terminator is added to the reaction mixture after the completion of acetylation without isolating the produced cellulose triacetate therefrom; and a neutralizing agent is further added to the reaction mixture to neutralize part of the acetylation catalyst; the residual acetylation catalyst is used as a hydrolysis catalyst in the ripening step; and a predetermined amount of water is added before the ripening step. Accordingly, the amounts of the acetylation catalyst, acetic acid, and water to 100 parts by weight of the cellulose triacetate are values determined on the assumption that all the material cellulose is fully converted into a fully tri-substituted cellulose triacetate at the time when the acetylation step completes. In actual procedures, the amounts of the acetylation catalyst, acetic acid, and water to 100 parts by weight of the cellulose triacetate should be calculated on the basis of the amount of material cellulose at the beginning of the acetylation step, and, in this case, the amounts of the acetylation catalyst, acetic acid, and water to 100 parts by weight of the material cellulose are obtained by multiplying the amounts to 100 parts by weight of the cellulose triacetate by 1.777, respectively.

The amount of an acetylation catalyst used in the ripening, on the basis of the material cellulose, is determined by subtracting the chemical equivalent of the acetylation catalyst fed to the reaction system from the chemical equivalent of the neutralizing agent fed to the reaction system, multiplying the resulting value by 1 gram-equivalent weight of the acetylation catalyst, and multiplying the resulting value by 1.777 as above.

Likewise, the amount of water on the basis of the material cellulose is determined by calculating the total amount of water fed to the reaction system on or before the ripening step, such as water fed to the reaction system at the completion of the acetylation step, and water fed to the reaction system at the beginning of the ripening, and multiplying the total water amount by 1.777.

The amount of acetic acid on the basis of the material cellulose is determined by adding the amount of acetic acid formed as a result of hydrolysis of acetic anhydride to the total amount of acetic acid fed to the reaction system in the pretreatment, acetylation step, and ripening step; and multiplying the resulting value by 1.777.

A ripening temperature (hydrolysis temperature) in the process is 40° C. to 90° C., and is preferably 40° C. to 80° C., more preferably 50° C. to 80° C., further preferably 60° C. to 80° C., and particularly preferably 65° C. to 78° C. Ripening, if carried out at an excessively high temperature, may cause an excessively high depolymerization rate to give a cellulose acetate having an excessively low molecular weight, while this may vary depending on the amount of the acetylation catalyst. In contrast, ripening, if carried out at an excessively low temperature, may cause an excessively low hydrolysis reaction rate, and this may adversely affect the productivity.

In a preferred embodiment on combination of reaction parameters, the ripening step is carried out in the presence of water in a relatively large amount (water amount in ripening) at a relatively low ripening temperature. In a more preferred embodiment, the ripening step is carried out in the presence of water in an amount of 38 to 48 percent by mole relative to the amount of the acetic acid at a ripening temperature of from 65° C. to 78° C. In such preferred combinations of the water amount and temperature in ripening, the amount of the acetylation catalyst is preferably relatively low, because a large amount of the acetylation catalyst may act to increase the variation (dispersion) of depolymerization rate depending on the water amount and temperature in ripening. Specifically, the amount of the acetylation catalyst is preferably 1.13 to 2.53 parts by weight to 100 parts by weight of the cellulose triacetate (i.e., 2 to 4.5 parts by weight to 100 parts by weight of the material cellulose).

[Termination of Ripening Reaction]

After the formation of a predetermined cellulose diacetate, the ripening reaction is terminated. Specifically, where necessary, the neutralizing agent may be added after the ripening (hydrolysis reaction or deacetylation). Of the neutralizing agents, the alkaline earth metal compounds are preferred, of which calcium compounds, such as calcium hydroxide, are more preferred. It is also accepted that the reaction product (a dope containing a cellulose diacetate) is poured into a precipitation solvent, such as water or an aqueous acetic acid solution, to precipitate the cellulose diacetate, the cellulose diacetate is separated, and subjected typically to washing with water to remove free metal components and sulfuric acid component. The washing with water may be conducted in the presence of the neutralizing agent. According to the above procedure, the formation of insoluble components and sparingly soluble components (e.g., unreacted cellulose and lowly acetylated cellulose) can be reduced while suppressing the cellulose diacetate from decreasing in degree of polymerization.

The resulting 6-position highly acetylated cellulose diacetates can be used as intact or after derivatization are usable typically in adsorbents, optical films and other films, coating materials, and agents for separating optical isomers. Addition of the 6-position highly acetylated cellulose diacetates or derivatives thereof to other substances or materials helps the substances or materials to have varying functions or to have additional novel functions. In particular, the cellulose diacetates have a high degree of acetyl substitution at the 6-position, have a not-so-high total degree of acetyl substitution so as to have a certain margin of introducing other acyl groups than acetyl group (e.g., an aromatic acyl group such as benzoyl group, or an aliphatic acyl group other than acetyl group, such as propionyl group) into the 2- and 3-positions, and have a relatively high molecular weight. Accordingly, they are adventurously usable as starting materials to give cellulose acylates of different acyl groups, which have a high total degree of acyl substitution. They are more advantageously usable as starting materials to give cellulose acylates of different acyl groups, which have a very high degree of acetyl substitution at the 6-position, a high degree of substitution with other acyl groups than acetyl group (e.g., an aromatic acyl group such as benzoyl group, or an aliphatic acyl group other than acetyl group, such as propionyl group) at the 2- and 3-positions, and a high total degree of acyl substitution. Such cellulose acylates of different acyl groups have superior optical properties and are thereby expected to be used typically as photographic materials and optical materials.

EXAMPLES

The present invention will be illustrated in further detail with reference to several examples below. It should be noted, however, these are illustrated only by way of example and never construed to limit the scope of the present invention.

Example 1

A sheet-like cellulose (softwood pulp) was refined into a flocculent cellulose with a disk refiner. To 100 g of the flocculent cellulose (with a water content of 8.0 percent by weight) was sprayed 32.71 g of acetic acid, and the mixture was thoroughly stirred and then left stand at a temperature of 24° C. for 60 minutes (activation step). The activated cellulose was combined with 348.98 g of acetic acid, 290.90 g of acetic anhydride, and 11.24 g of sulfuric acid, the mixture was held at 15° C. for 20 minutes, raised in temperature at a rate of 0.31° C. per minute to 45° C., held at the temperature for 70 minutes to carry out acetylation, and thereby yielded a cellulose triacetate. Next, the acetylation reaction was terminated by adding 0.19 g of acetic acid, 78.08 g of water, and 9.27 g of magnesium acetate.

The resulting reaction mixture was combined with 0.02 g of acetic acid, 2.86 g of water, and 0.91 g of magnesium acetate, followed by a ripening reaction at 75° C. for 140 minutes. In the reaction system at the beginning of the ripening reaction, the amount of water was 40.0 percent by mole relative to the amount of the acetic acid, and the amount of sulfuric acid was 4 percent by weight to the amount of the material cellulose. After the completion of reaction, the ripening reaction was terminated by adding 0.15 g of acetic acid, 23.17 g of water, and 7.37 g of magnesium acetate.

The reaction mixture was added to a diluted acetic acid with stirring to precipitate a product, the precipitated product was immersed in a diluted aqueous calcium hydroxide solution, separated by filtration, dried, and thereby yielded a cellulose diacetate. The product cellulose diacetate had a DSt of 2.36, a DS6 of 0.77, and a 6-percent viscosity of 111 mPa·s. The cellulose diacetate was found to show an intermolecular distribution curve of degree of substitution in which the maximum peak has a half height width of 0.136.

Example 2

A sheet-like cellulose (softwood pulp) was refined into a flocculent cellulose with a disk refiner. To 100 g of the flocculent cellulose (with a water content of 8.0 percent by weight) was sprayed 32.71 g of acetic acid, and the mixture was thoroughly stirred and then left stand at a temperature of 24° C. for 60 minutes (activation step). The activated cellulose was combined with 340.91 g of acetic acid, 297.76 g of acetic anhydride, and 11.24 g of sulfuric acid, the mixture was held at 15° C. for 20 minutes, raised in temperature at a rate of 0.31° C. per minute to 45° C., held at the temperature for 70 minutes to carry out acetylation, and thereby yielded a cellulose triacetate. Next, the acetylation reaction was terminated by adding 0.19 g of acetic acid, 78.08 g of water, and 9.27 g of magnesium acetate.

The resulting reaction mixture was combined with 0.02 g of acetic acid, 2.86 g of water, and 0.91 g of magnesium acetate, followed by a ripening reaction at 75° C. for 180 minutes. In the reaction system at the beginning of the ripening reaction, the amount of water with respect to the acetic acid was 40.0 percent by mole, and the amount of sulfuric acid with respect to the material cellulose was 4 percent by weight. After the completion of reaction, the ripening reaction was terminated by adding 0.15 g of acetic acid, 23.17 g of water, and 7.37 g of magnesium acetate.

The reaction mixture was added to a diluted acetic acid with stirring to precipitate a product, the precipitated product was immersed in a diluted aqueous calcium hydroxide solution, separated by filtration, dried, and thereby yielded a cellulose diacetate. The product cellulose diacetate had a DSt of 2.26, a DS6 of 0.76, and a 6-percent viscosity of 54 mPa·s. The cellulose diacetate was found to show an intermolecular distribution curve of degree of substitution in which the maximum peak has a half height width of 0.141.

Example 3

A sheet-like cellulose (softwood pulp) was refined into a flocculent cellulose with a disk refiner. To 100 g of the flocculent cellulose (with a water content of 8.0 percent by weight) was sprayed 32.71 g of acetic acid, and the mixture was thoroughly stirred and then left stand at a temperature of 24° C. for 60 minutes (activation step). The activated cellulose was combined with 340.91 g of acetic acid, 297.76 g of acetic anhydride, and 10.22 g of sulfuric acid, the mixture was held at 15° C. for 20 minutes, raised in temperature at a rate of 0.31° C. per minute to 45° C., held at the temperature for 70 minutes to carry out acetylation, and thereby yielded a cellulose triacetate. Next, the acetylation reaction was terminated by adding 0.16 g of acetic acid, 68.59 g of water, and 7.80 g of magnesium acetate.

The resulting reaction mixture was combined with 0.02 g of acetic acid, 2.86 g of water, and 0.91 g of magnesium acetate, followed by a ripening reaction at 72° C. for 155 minutes. In the reaction system at the beginning of the ripening reaction, the amount of water with respect to the acetic acid was 35.0 percent by mole, and the amount of sulfuric acid with respect to the material cellulose was 4 percent by weight. After the completion of reaction, the ripening reaction was terminated by adding 0.15 g of acetic acid, 23.17 g of water, and 7.37 g of magnesium acetate.

The reaction mixture was added to a diluted acetic acid with stirring to precipitate a product, the precipitated product was immersed in a diluted aqueous calcium hydroxide solution, separated by filtration, dried, and thereby yielded a cellulose diacetate. The product cellulose diacetate had a DSt of 2.41, a DS6 of 0.78, and a 6-percent viscosity of 108 mPa·s. The cellulose diacetate was found to show an intermolecular distribution curve of degree of substitution in which the maximum peak has a half height width of 0.133.

Example 4

A sheet-like cellulose (softwood pulp) was refined into a flocculent cellulose with a disk refiner. To 100 g of the flocculent cellulose (with a water content of 8.0 percent by weight) was sprayed 32.71 g of acetic acid, and the mixture was thoroughly stirred and then left stand at a temperature of 24° C. for 60 minutes (activation step). The activated cellulose was combined with 333.50 g of acetic acid, 304.06 g of acetic anhydride, and 10.22 g of sulfuric acid, the mixture was held at 15° C. for 20 minutes, raised in temperature at a rate of 0.31° C. per minute to 45° C., held at the temperature for 70 minutes to carry out acetylation, and thereby yielded a cellulose triacetate. Next, the acetylation reaction was terminated by adding 0.16 g of acetic acid, 50.19 g of water, and 7.80 g of magnesium acetate.

The resulting reaction mixture was combined with 0.02 g of acetic acid, 2.86 g of water, and 0.91 g of magnesium acetate, followed by a ripening reaction at 65° C. for 250 minutes. In the reaction system at the beginning of the ripening reaction, the amount of water with respect to the acetic acid was 25.0 percent by mole, and the amount of sulfuric acid with respect to the material cellulose was 4 percent by weight. After the completion of reaction, the ripening reaction was terminated by adding 0.15 g of acetic acid, 22.49 g of water, and 7.15 g of magnesium acetate.

The reaction mixture was added to a diluted acetic acid with stirring to precipitate a product, the precipitated product was immersed in a diluted aqueous calcium hydroxide solution, separated by filtration, dried, and thereby yielded a cellulose diacetate. The product cellulose diacetate had a DSt of 2.50, a DS6 of 0.82, and a 6-percent viscosity of 137 mPa·s. The cellulose diacetate was found to show an intermolecular distribution curve of degree of substitution in which the maximum peak has a half height width of 0.128.

Comparative Example 1

A sheet-like cellulose (softwood pulp) was refined into a flocculent cellulose with a disk refiner. To 100 g of the flocculent cellulose (with a water content of 8.0 percent by weight) was sprayed 32.71 g of acetic acid, and the mixture was thoroughly stirred and then left stand at a temperature of 24° C. for 60 minutes (activation step). The activated cellulose was combined with 358.51 g of acetic acid, 214.99 g of acetic anhydride, and 14.15 g of sulfuric acid, the mixture was held at 15° C. for 20 minutes, raised in temperature at a rate of 0.31° C. per minute to 45° C., held at the temperature for 70 minutes to carry out acetylation, and thereby yielded a cellulose triacetate. Next, the acetylation reaction was terminated by adding 0.28 g of acetic acid, 89.55 g of water, and 13.60 g of magnesium acetate.

The resulting reaction mixture was combined with 0.06 g of acetic acid, 9.14 g of water, and 2.90 g of magnesium acetate, followed by a ripening reaction at 85° C. for 90 minutes. In the reaction system at the beginning of the ripening reaction, the amount of water with respect to the acetic acid was 55.8 percent by mole, and the amount of sulfuric acid with respect to the material cellulose was 2.5 percent by weight. After the completion of reaction, the ripening reaction was terminated by adding 0.10 g of acetic acid, 15.81 g of water, and 5.03 g of magnesium acetate.

The reaction mixture was added to a diluted acetic acid with stirring to precipitate a product, the precipitated product was immersed in a diluted aqueous calcium hydroxide solution, separated by filtration, dried, and thereby yielded a cellulose diacetate. The product cellulose diacetate had a DSt of 2.47, a DS6 of 0.74, and a 6-percent viscosity of 138 mPa·s. The cellulose diacetate was found to show an intermolecular distribution curve of degree of substitution in which the maximum peak has a half height width of 0.140.

Comparative Example 2

A sheet-like cellulose (softwood pulp) was refined into a flocculent cellulose with a disk refiner. To 100 g of the flocculent cellulose (with a water content of 8.0 percent by weight) was sprayed 32.71 g of acetic acid, and the mixture was thoroughly stirred and then left stand at a temperature of 24° C. for 60 minutes (activation step). The activated cellulose was combined with 358.51 g of acetic acid, 214.99 g of acetic anhydride, and 14.15 g of sulfuric acid, the mixture was held at 15° C. for 20 minutes, raised in temperature at a rate of 0.31° C. per minute to 45° C., held at the temperature for 70 minutes to carry out acetylation, and thereby yielded a cellulose triacetate. Next, the acetylation reaction was terminated by adding 0.28 g of acetic acid, 89.55 g of water, and 13.60 g of magnesium acetate.

The resulting reaction mixture was combined with 0.06 g of acetic acid, 9.14 g of water, and 2.90 g of magnesium acetate, followed by a ripening reaction at 85° C. for 175 minutes. In the reaction system at the beginning of the ripening reaction, the amount of water with respect to the acetic acid was 55.8 percent by mole, and the amount of sulfuric acid with respect to the material cellulose was 2.5 percent by weight. After the completion of reaction, the ripening reaction was terminated by adding 0.10 g of acetic acid, 15.81 g of water, and 5.03 g of magnesium acetate.

The reaction mixture was added to a diluted acetic acid with stirring to precipitate a product, the precipitated product was immersed in a diluted aqueous calcium hydroxide solution, separated by filtration, dried, and thereby yielded a cellulose diacetate. The product cellulose diacetate had a DSt of 2.22, a DS6 of 0.70, and a 6-percent viscosity of 49 mPa·s. The cellulose diacetate was found to show an intermolecular distribution curve of degree of substitution in which the maximum peak has a half height width of 0.149.

Comparative Example 3

A sheet-like cellulose (softwood pulp) was refined into a flocculent cellulose with a disk refiner. To 100 g of the flocculent cellulose (with a water content of 8.0 percent by weight) was sprayed 32.71 g of acetic acid, and the mixture was thoroughly stirred and then left stand at a temperature of 24° C. for 60 minutes (activation step). The activated cellulose was combined with 344.95 g of acetic acid, 294.33 g of acetic anhydride, and 11.24 g of sulfuric acid, the mixture was held at 15° C. for 20 minutes, raised in temperature at a rate of 0.31° C. per minute to 45° C., held at the temperature for 70 minutes to carry out acetylation, and thereby yielded a cellulose triacetate. Next, the acetylation reaction was terminated by adding 0.19 g of acetic acid, 98.13 g of water, and 9.27 g of magnesium acetate.

The resulting reaction mixture was combined with 0.06 g of acetic acid, 9.14 g of water, and 2.90 g of magnesium acetate, followed by a ripening reaction at 75° C. for 180 minutes. In the reaction system at the beginning of the ripening reaction, the amount of water with respect to the acetic acid was 50.8 percent by mole, and the amount of sulfuric acid with respect to the material cellulose was 4.0 percent by weight. After the completion of reaction, the ripening reaction was terminated by adding 0.15 g of acetic acid, 23.17 g of water, and 7.37 g of magnesium acetate.

The reaction mixture was added to a diluted acetic acid with stirring to precipitate a product, the precipitated product was immersed in a diluted aqueous calcium hydroxide solution, separated by filtration, dried, and thereby yielded a cellulose diacetate. The product cellulose diacetate had a DSt of 2.28, a DS6 of 0.73, and a 6-percent viscosity of 175 mPa·s. The cellulose diacetate was found to show an intermolecular distribution curve of degree of substitution in which the maximum peak has a half height width of 0.128.

Comparative Example 4

A sheet-like cellulose (softwood pulp) was refined into a flocculent cellulose with a disk refiner. To 100 g of the flocculent cellulose (with a water content of 8.0 percent by weight) was sprayed 29.17 g of acetic acid, and the mixture was thoroughly stirred and then left stand at a temperature of 24° C. for 60 minutes (activation step). The activated cellulose was combined with 336.15 g of acetic acid, 279.44 g of acetic anhydride, and 14.24 g of sulfuric acid, the mixture was held at 15° C. for 20 minutes, raised in temperature at a rate of 0.31° C. per minute to 45° C., held at the temperature for 70 minutes to carry out acetylation, and thereby yielded a cellulose triacetate. Next, the acetylation reaction was terminated by adding 0.28 g of acetic acid, 153.98 g of water, and 13.48 g of magnesium acetate.

The resulting reaction mixture was combined with 0.10 g of acetic acid, 14.45 g of water, and 4.59 g of magnesium acetate, followed by a ripening reaction at 90° C. for 190 minutes. In the reaction system at the beginning of the ripening reaction, the amount of water with respect to the acetic acid was 89.9 percent by mole, and the amount of sulfuric acid with respect to the material cellulose was 1.5 percent by weight. After the completion of reaction, the ripening reaction was terminated by adding 0.08 g of acetic acid, 11.75 g of water, and 3.74 g of magnesium acetate.

The reaction mixture was added to a diluted acetic acid with stirring to precipitate a product, the precipitated product was immersed in a diluted aqueous calcium hydroxide solution, separated by filtration, dried, and thereby yielded a cellulose diacetate. The product cellulose diacetate had a DSt of 2.19, a DS6 of 0.64, and a 6-percent viscosity of 191 mPa·s. The cellulose diacetate was found to show an intermolecular distribution curve of degree of substitution in which the maximum peak has a half height width of 0.138.

Comparative Example 5

A sheet-like cellulose (softwood pulp) was refined into a flocculent cellulose with a disk refiner. To 100 g of the flocculent cellulose (with a water content of 8.0 percent by weight) was sprayed 32.71 g of acetic acid, and the mixture was thoroughly stirred and then left stand at a temperature of 24° C. for 60 minutes (activation step). The activated cellulose was combined with 377.56 g of acetic acid, 321.67 g of acetic anhydride, and 10.90 g of sulfuric acid, the mixture was held at 15° C. for 20 minutes, raised in temperature at a rate of 0.31° C. per minute to 45° C., held at the temperature for 70 minutes to carry out acetylation, and thereby yielded a cellulose triacetate. Next, the acetylation reaction was terminated by adding 0.18 g of acetic acid, 26.96 g of water, and 8.57 g of magnesium acetate.

The resulting reaction mixture was combined with 0.09 g of acetic acid and 25.55 g of water, followed by a ripening reaction at 65° C. for 270 minutes. In the reaction system at the beginning of the ripening reaction, the amount of water with respect to the acetic acid was 20 percent by mole, and the amount of sulfuric acid with respect to the material cellulose was 4.5 percent by weight. After the completion of reaction, the ripening reaction was terminated by adding 0.15 g of acetic acid, 23.4 g of water, and 7.44 g of magnesium acetate.

The reaction mixture was added to a diluted acetic acid with stirring to precipitate a product, the precipitated product was immersed in a diluted aqueous calcium hydroxide solution, separated by filtration, dried, and thereby yielded a cellulose diacetate. The product cellulose diacetate had a DSt of 2.53, a DS6 of 0.82, and a 6-percent viscosity of 29 mPa·s. The cellulose diacetate was found to show an intermolecular distribution curve of degree of substitution in which the maximum peak has a half height width of 0.137.

The results are shown in Table 1. In "2.0≦DSt<2.6" and "0.400≧(DS6/DSt)≧0.531−0.088×DSt" in Table 1, a sample satisfying the condition is indicated by "Passed", and one not satisfying the condition is indicated by "Failed". A "half height width of substitution degree distribution" in Table 1 means a "half height width of a maximum peak in an intermolecular distribution curve of degree of substitution".

FIG. 1 is a graph in which DSt is plotted against DSt/DS6 in the cellulose diacetates produced according to Examples 1 to 4 and Comparative Examples 1 to 4, with the ordinate indicating DSt/DS and the abscissa indicating DSt. In FIG. 1, data indicated by the square are data of samples according to Examples 1 to 4, and data indicated by the triangle are data of samples according to Comparative Examples 1 to 4. The region boxed with thick line is the region specified according to the present invention.

TABLE 1

|  | Examples | | | | Comparative Examples | | | | |
| --- | --- | --- | --- | --- | --- | --- | --- | --- | --- |
|  | 1 | 2 | 3 | 4 | 1 | 2 | 3 | 4 | 5 |
| Water amount in ripening (percent by mole, to acetic acid) | 40.0 | 40.0 | 35.0 | 25.0 | 55.8 | 55.8 | 50.8 | 89.9 | 20.0 |
| Sulfuric acid amount in ripening (part by weight; to 100 parts by weight of cellulose) | 4.0 | 4.0 | 4.0 | 4.0 | 2.5 | 2.5 | 4.0 | 1.5 | 4.5 |
| Ripening temperature (° C.) | 75.0 | 75.0 | 72.0 | 65.0 | 85.0 | 85.0 | 75.0 | 90.0 | 65.0 |
| Ripening time (minute) | 140 | 180 | 155 | 250 | 90 | 175 | 180 | 190 | 270 |
| Cellulose diacetate |  |  |  |  |  |  |  |  |  |
| DSt | 2.36 | 2.26 | 2.41 | 2.50 | 2.47 | 2.22 | 2.28 | 2.19 | 2.53 |
| DS6 | 0.77 | 0.76 | 0.78 | 0.82 | 0.74 | 0.70 | 0.73 | 0.64 | 0.82 |

TABLE 1-continued

|  | Examples | | | | Comparative Examples | | | | |
| --- | --- | --- | --- | --- | --- | --- | --- | --- | --- |
|  | 1 | 2 | 3 | 4 | 1 | 2 | 3 | 4 | 5 |
| 6-percent viscosity (mPa · s) | 111 | 54 | 108 | 137 | 138 | 49 | 175 | 191 | 29 |
| DS6/DSt | 0.326 | 0.336 | 0.324 | 0.328 | 0.300 | 0.315 | 0.320 | 0.292 | 0.324 |
| 0.531 − 0.088 × DSt | 0.323 | 0.332 | 0.319 | 0.311 | 0.314 | 0.336 | 0.330 | 0.338 | 0.308 |
| $2.00 \leq DSt \leq 2.60$ | Passed | Passed | Passed | Passed | Passed | Passed | Passed | Passed | Passed |
| $0.400 \geq (DS6/DSt) \geq 0.531 - 0.088 \times DSt$ | Passed | Passed | Passed | Passed | Failed | Failed | Failed | Failed | Passed |
| Half height width of substitution degree distribution | 0.136 | 0.141 | 0.133 | 0.128 | 0.140 | 0.149 | 0.128 | 0.138 | 0.137 |

While there have been described what are at present considered to be the preferred embodiments of the present invention, it should be understood by those skilled in the art that various modifications, combinations, subcombinations, and alterations may occur depending on design requirements and other factors insofar as they are within the spirit and scope of the appended claims or the equivalents thereof.

What is claimed is:

1. A cellulose diacetate comprising a 6-position highly acetylated cellulose diacetate having a 6-percent viscosity of 45 to 200 mPa·s, and having a total degree of acetyl substitution of DSt and a degree of acetyl substitution at the 6-position of DS6, wherein DSt and DS6 satisfy the following Conditions (1) and (2):

$$2.0 \leq DSt < 2.6 \quad (1)$$

$$0.400 \geq (DS6/DSt) \geq 0.531 - 0.088 \times DSt \quad (2).$$

2. The cellulose diacetate according to claim 1, wherein the cellulose diacetate shows an intermolecular distribution curve of degree of substitution in which a maximum peak has a half height width of 0.150 or less.

3. The cellulose diacetate according to claim 2, wherein the degree of acetyl substitution at the 6-position DS6 is from 0.745 to 0.900.

4. The cellulose diacetate according to claim 2, wherein the cellulose diacetate has a viscosity-average degree of polymerization of from 142 to 206.

5. The cellulose diacetate according to claim 3, wherein the cellulose diacetate has a sulfate content of 100 ppm by weight or less based on the total amount of the cellulose diacetate.

6. The cellulose diacetate according to claim 1, wherein DSt satisfies the condition: $2.10 \leq DSt \leq 2.51$.

7. A process for the production of a cellulose diacetate, comprising the step of:

hydrolyzing a cellulose triacetate having a total degree of acetyl substitution of 2.6 or more in acetic acid, in the presence of an acetylation catalyst in an amount of 0.56 to 8.44 parts by weight to 100 parts by weight of the cellulose triacetate and in the presence of water in an amount of 22 percent by mole or more and less than 50 percent by mole relative to the amount of the acetic acid, at a temperature of from 40° C. to 90° C., to give a cellulose diacetate comprising a 6-position highly acetylated cellulose diacetate having a 6-percent viscosity of 45 to 200 mPa·s, and having a total degree of acetyl substitution of DSt and a degree of acetyl substitution at the 6-position of DS6, wherein DSt and DS6 satisfy the following Conditions (1) and (2):

$$2.0 \leq DSt < 2.6 \quad (1)$$

$$0.400 \geq (DS6/DSt) \geq 0.531 - 0.088 \times DSt \quad (2).$$

8. The process for the production of a cellulose diacetate according to claim 7, comprising the steps of:

reacting a cellulose with an acetylating agent in a solvent in the presence of a catalyst to give a cellulose triacetate having a total degree of acetyl substitution of 2.6 or more; and hydrolyzing the above-prepared cellulose triacetate in acetic acid in the presence of an acetylation catalyst in an amount of 0.56 to 8.44 parts by weight to 100 parts by weight of the cellulose triacetate and in the presence of water in an amount of 22 percent by mole or more and less than 50 percent by mole relative to the amount of the acetic acid at a temperature of from 40° C. to 90° C., to give the cellulose diacetate comprising a 6-position highly acetylated cellulose diacetate.

9. The process for the production of a cellulose diacetate according to claim 7 or 8, wherein the total degree of acetyl substitution DSt is 2.0 or more and less than 2.6, and the 6-position highly acetylated cellulose diacetate has the degree of acetyl substitution at the 6-position DS6 of 0.745 or more.

\* \* \* \* \*